(12) United States Patent
Nakamura

(10) Patent No.: US 10,305,357 B2
(45) Date of Patent: May 28, 2019

(54) VIBRATION GENERATOR HAVING SWING UNIT, FRAME AND ELASTIC MEMBER

(71) Applicant: MINEBEA CO., LTD., Kitasaku-gun, Nagano (JP)

(72) Inventor: Manabu Nakamura, Tokyo-to (JP)

(73) Assignee: MINEBEA CO., LTD., Kitasaku-gun (JP)

( * ) Notice: Subject to any disclaimer, the term of this patent is extended or adjusted under 35 U.S.C. 154(b) by 0 days.

(21) Appl. No.: 15/363,879

(22) Filed: Nov. 29, 2016

(65) Prior Publication Data

US 2017/0085164 A1 Mar. 23, 2017

Related U.S. Application Data

(63) Continuation of application No. 13/891,656, filed on May 10, 2013, now Pat. No. 9,543,816.

(30) Foreign Application Priority Data

May 22, 2012 (JP) ................. 2012-116576

(51) Int. Cl.
*H02K 33/00* (2006.01)
*H02K 33/16* (2006.01)
*H02K 5/124* (2006.01)
*B06B 1/04* (2006.01)
*H02K 5/04* (2006.01)
(Continued)

(52) U.S. Cl.
CPC ............. *H02K 33/00* (2013.01); *H02K 33/16* (2013.01); *B06B 1/045* (2013.01); *G04C 3/102* (2013.01); *G04C 3/107* (2013.01); *H02K 5/04* (2013.01); *H02K 5/124* (2013.01); *H02K 33/02* (2013.01); *H02K 33/06* (2013.01)

(58) Field of Classification Search
CPC ........ H02K 33/00; H02K 33/02; H02K 33/16; H02K 5/04; H02K 5/24; G04C 3/102; G04C 3/107
USPC ............... 310/15, 16, 17, 25, 28, 36, 37, 51; 335/19, 193
See application file for complete search history.

(56) References Cited

U.S. PATENT DOCUMENTS 5,495,762 A 3/1996 Tamura et al.
6,054,335 A 4/2000 Sun et al.
(Continued)

FOREIGN PATENT DOCUMENTS

EP 0970758 A1 1/2000
EP 1515420 A1 3/2005
(Continued)

OTHER PUBLICATIONS

Mar. 22, 2016 Office Action issued in Japanese Patent Application No. 2012-116576.
(Continued)

*Primary Examiner* — Bernard Rojas
*Assistant Examiner* — Rashad H Johnson
(74) *Attorney, Agent, or Firm* — Oliff PLC

(57) ABSTRACT

A vibrator includes a frame, a swing unit, and an elastic member. The swing unit is disposed within the frame and holds a magnet. The elastic member connects the swing unit and the frame. The swing unit is movable with respect to the frame while deforming the elastic member. The frame, the swing unit, and the elastic member are integrally molded with each other.

20 Claims, 8 Drawing Sheets

(51) Int. Cl.
*H02K 33/02* (2006.01)
*G04C 3/10* (2006.01)
*H02K 33/06* (2006.01)

(56) References Cited

U.S. PATENT DOCUMENTS

| | | | |
|---|---|---|---|
| 7,671,493 B2 | 3/2010 | Takashima et al. | |
| 8,269,379 B2 | 9/2012 | Dong et al. | |
| 8,624,449 B2 | 1/2014 | Kim et al. | |
| 8,624,450 B2 | 1/2014 | Dong et al. | |
| 2003/0169895 A1 | 9/2003 | Fukuyama | |
| 2004/0169425 A1 | 9/2004 | Aihara | |
| 2009/0267423 A1 | 10/2009 | Kajiwara et al. | |
| 2010/0052474 A1 | 3/2010 | Honma et al. | |
| 2010/0213773 A1 | 8/2010 | Dong et al. | |
| 2011/0012441 A1 | 1/2011 | Oh et al. | |
| 2011/0051987 A1 | 3/2011 | Ueda et al. | |
| 2011/0062804 A1 | 3/2011 | Lee et al. | |
| 2011/0068640 A1* | 3/2011 | Choi | H02K 5/04 310/25 |
| 2011/0089772 A1 | 4/2011 | Dong et al. | |
| 2011/0101796 A1 | 5/2011 | Odajima et al. | |
| 2011/0101797 A1 | 5/2011 | Lee et al. | |
| 2011/0133577 A1 | 6/2011 | Lee | |
| 2011/0241451 A1 | 10/2011 | Park | |
| 2011/0243368 A1 | 10/2011 | Doh et al. | |
| 2012/0032534 A1 | 2/2012 | Choi | |
| 2012/0032535 A1* | 2/2012 | Park | H02K 35/02 310/25 |
| 2012/0049660 A1* | 3/2012 | Park | B06B 1/045 310/25 |
| 2012/0104875 A1 | 5/2012 | Park | |
| 2012/0108299 A1 | 5/2012 | Yang et al. | |
| 2012/0112565 A1 | 5/2012 | Lee | |
| 2012/0169148 A1* | 7/2012 | Kim | H02K 33/16 310/25 |
| 2012/0169151 A1 | 7/2012 | Dong et al. | |
| 2012/0187780 A1 | 7/2012 | Bang et al. | |
| 2012/0313459 A1 | 12/2012 | Zhang | |
| 2013/0076178 A1 | 3/2013 | Kuroda et al. | |
| 2013/0099602 A1 | 4/2013 | Park et al. | |
| 2013/0193779 A1 | 8/2013 | Kuroda | |
| 2013/0200732 A1 | 8/2013 | Jun et al. | |
| 2013/0229070 A1* | 9/2013 | Akanuma | H02K 33/00 310/25 |
| 2013/0241321 A1* | 9/2013 | Akanuma | H02K 5/24 310/25 |
| 2014/0056463 A1 | 2/2014 | Kim et al. | |
| 2014/0334655 A1* | 11/2014 | Gao | H04R 1/028 381/334 |
| 2017/0056927 A1* | 3/2017 | Chun | H02K 33/16 |

FOREIGN PATENT DOCUMENTS

| | | |
|---|---|---|
| JP | H02-243918 A | 9/1990 |
| JP | H05-88242 U | 12/1993 |
| JP | H09-85169 A | 3/1997 |
| JP | H10-14194 A | 1/1998 |
| JP | H10-14195 A | 1/1998 |
| JP | H10-308047 A | 11/1998 |
| JP | H11-192455 A | 7/1999 |
| JP | H11-214586 A | 8/1999 |
| JP | H11-275846 A | 10/1999 |
| JP | 2000-021491 A | 1/2000 |
| JP | 2002-200460 A | 7/2002 |
| JP | 2002-225067 A | 8/2002 |
| JP | 2002-361174 A | 12/2002 |
| JP | 2003-24871 A | 1/2003 |
| JP | 2003-154314 A | 5/2003 |
| JP | 2003-515435 A | 5/2003 |
| JP | 2003-305409 A | 10/2003 |
| JP | 2004-023909 A | 1/2004 |
| JP | 2004-195411 A | 7/2004 |
| JP | 2004-261684 A | 9/2004 |
| JP | 2005-12935 A | 1/2005 |
| JP | 2005-012987 A | 1/2005 |
| JP | 2005-028331 A | 2/2005 |
| JP | 2005-195639 A | 7/2005 |
| JP | 2005-303895 A | 10/2005 |
| JP | 2006-150310 A | 6/2006 |
| JP | 2006-320887 A | 11/2006 |
| JP | 2007-104898 A | 4/2007 |
| JP | 2008-154303 A | 7/2008 |
| JP | 2009-081913 A | 4/2009 |
| JP | 2009-100595 A | 5/2009 |
| JP | 2009-213952 A | 9/2009 |
| JP | 2009-303443 A | 12/2009 |
| JP | 2010-29037 A | 2/2010 |
| JP | 2010-036131 A | 2/2010 |
| JP | 2010-082508 A | 4/2010 |
| JP | 2010-89061 A | 4/2010 |
| JP | 2010-094567 A | 4/2010 |
| JP | 2011019384 A | 1/2011 |
| JP | 2011-072856 A | 4/2011 |
| JP | 2011-097747 A | 5/2011 |
| JP | 2011-115672 A | 6/2011 |
| JP | 2011-173074 A | 9/2011 |

OTHER PUBLICATIONS

Jan. 31, 2017 Office Action issued in Japanese Patent Application No. 2016-204923.
Apr. 24, 2018 Office Action issued in Japanese Patent Application No. 2017-140502.

* cited by examiner

VIBRATION GENERATOR HAVING SWING UNIT, FRAME AND ELASTIC MEMBER

This application is a continuation application of U.S. patent application Ser. No. 13/891,656, filed May 10, 2013, which claims priority to and is based on Japanese Patent Application No. 2012-116576 filed with the Japan Patent Office on May 22, 2012, the entire content of which is hereby incorporated by reference.

BACKGROUND OF THE INVENTION

Field of the Invention

The present invention relates to vibrators and vibration generators, and in particular to a vibrator capable of performing reciprocatory movement to generate vibration as well as to a vibration generator.

Description of the Related Art

A vibration generator that generates vibration by moving a vibrator is used. For example, a vibration generator that causes a vibrator having a magnet to perform a reciprocatory motion using a magnetic force is used.

The Document 1 listed below discloses a linear motor of a structure having a magnet as a moving unit within a frame unit as a stationary unit and a plate spring provided between the magnet and the frame unit to hold the magnet. In this linear motor, the magnet moves with respect to the frame unit by a coil unit disposed so as to sandwich the magnet from above and underneath being excited.

[Document 1] Japanese Patent Publication Laying-Open No. 2010-36131

In the meantime, the vibration generator as described in the Document 1 moves the magnet by urging the magnet by the plate spring. Accordingly, it is necessary to secure a relatively large space for the plate spring to deform. However, there is a limit to increase a size of the vibrator relative to the vibration generator, and it is difficult to increase a vibration amount. In other words, it is necessary to increase a size of the vibration generator itself in order to increase the vibration amount.

Further, the vibration generator as described in the Document 1 is configured by assembling the magnet, the plate spring, and the frame unit that are separate members from each other. Accordingly, the number of steps required in order to assemble the vibration generator is large, and a process for manufacturing the vibration generator becomes relatively complicated. Further, it is relatively difficult to ensure assembly accuracy, and variation in performance of vibration generators (individual variability) increases.

The present invention is made in order to address the above problems, and an object of the present invention is to provide a vibrator that can be easily and accurately assembled and provide a large vibration force relative to a size of the vibration generator, as well as a vibration generator.

SUMMARY OF THE INVENTION

In order to achieve the above object, according to one aspect of this invention, a vibrator is provided with: a frame; a swing unit disposed within the frame and for holding a magnet; and an elastic member connecting the swing unit and the frame, wherein the swing unit is movable with respect to the frame while deforming the elastic member, and the frame, the swing unit, and the elastic member are integrally molded with each other.

According to another aspect of this invention, a vibration generator is provided with: the vibrators described above; and a coil disposed so as to face toward the swing unit of the vibrator, wherein the swing unit moves with respect to the frame according to excitation of the coil.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Hereinafter, a vibration generator according to one embodiment of this invention will be described.

The vibration generator has such a structure that a portion of a vibrator for holding a magnet is supported movably with respect to a different portion of the vibration generator. A coil is disposed near the magnet with a space from the magnet. The coil generates a magnetic field for changing at least one of a position and a posture of the magnet. The vibration generator generates a vibration force by the vibrator deforming according to excitation of the coil to cause the magnet to perform a reciprocatory motion. Specifically, the vibration generator is a so-called linear type.

First Embodiment

Figure 1:
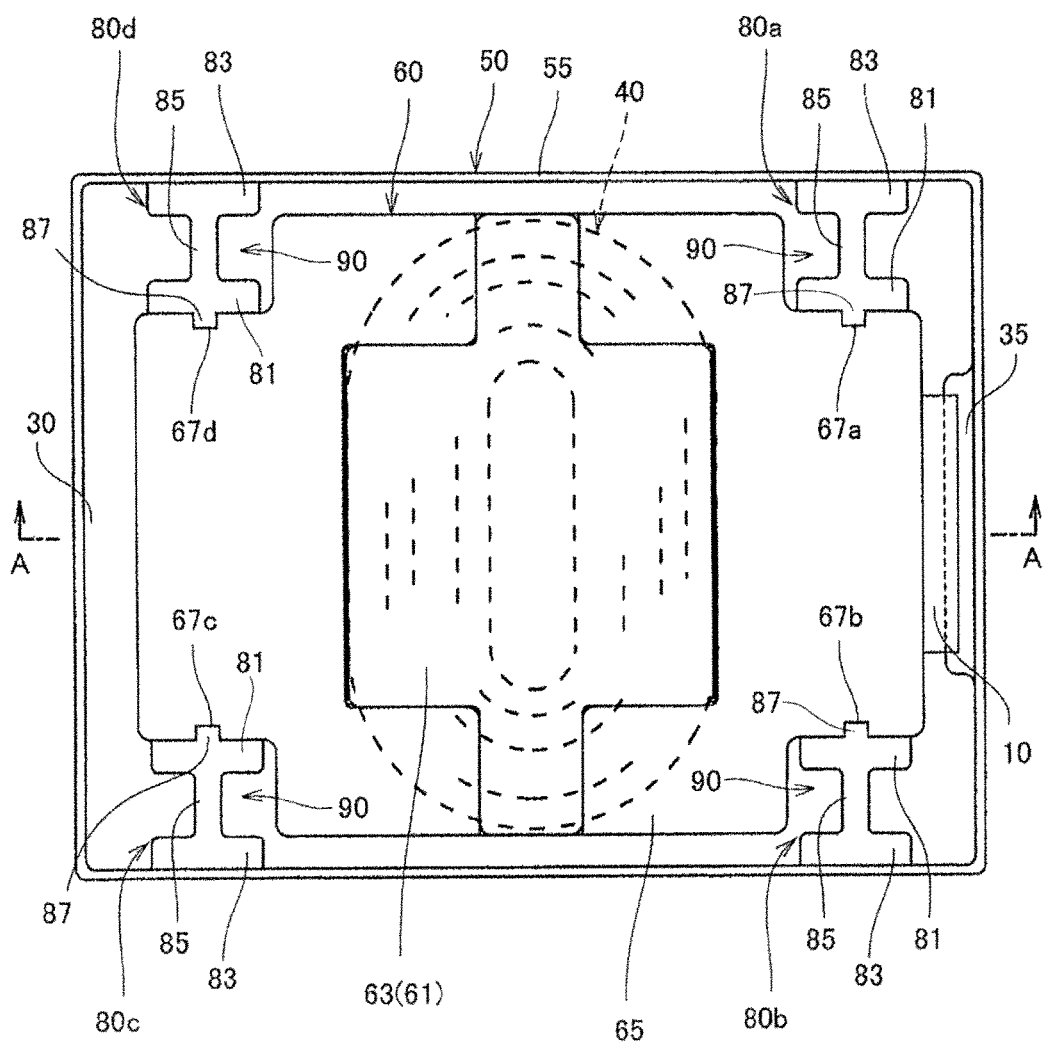
FIG. 1 is a plan view illustrating a vibration generator according to one embodiment of this invention.
Figure 2:
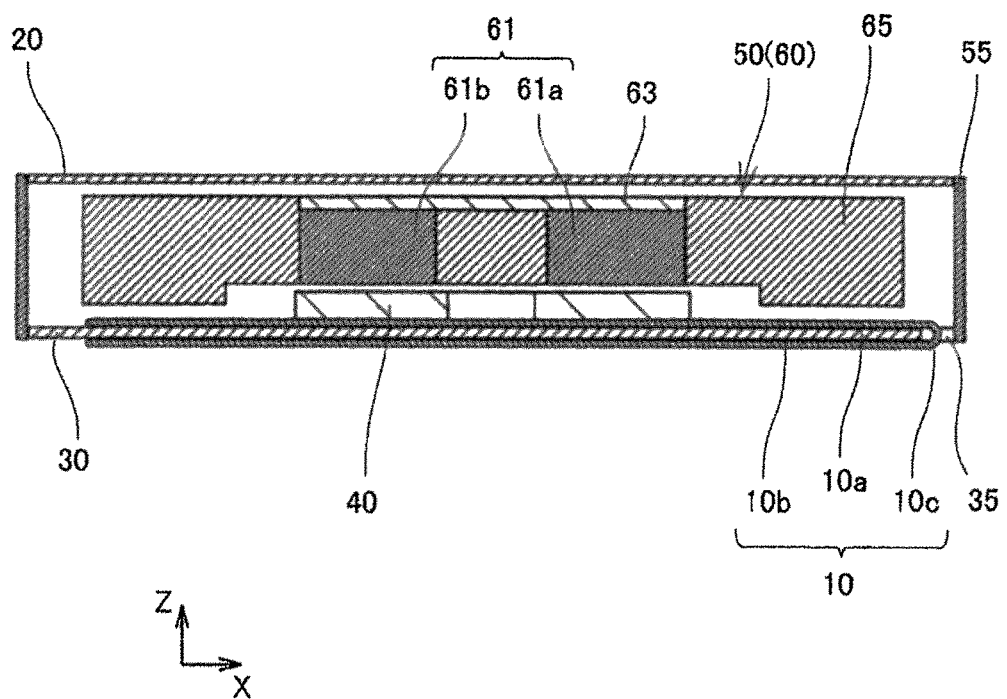
FIG. 2 is a cross-sectional view taken along line A-A in FIG. 1.
Figure 3:
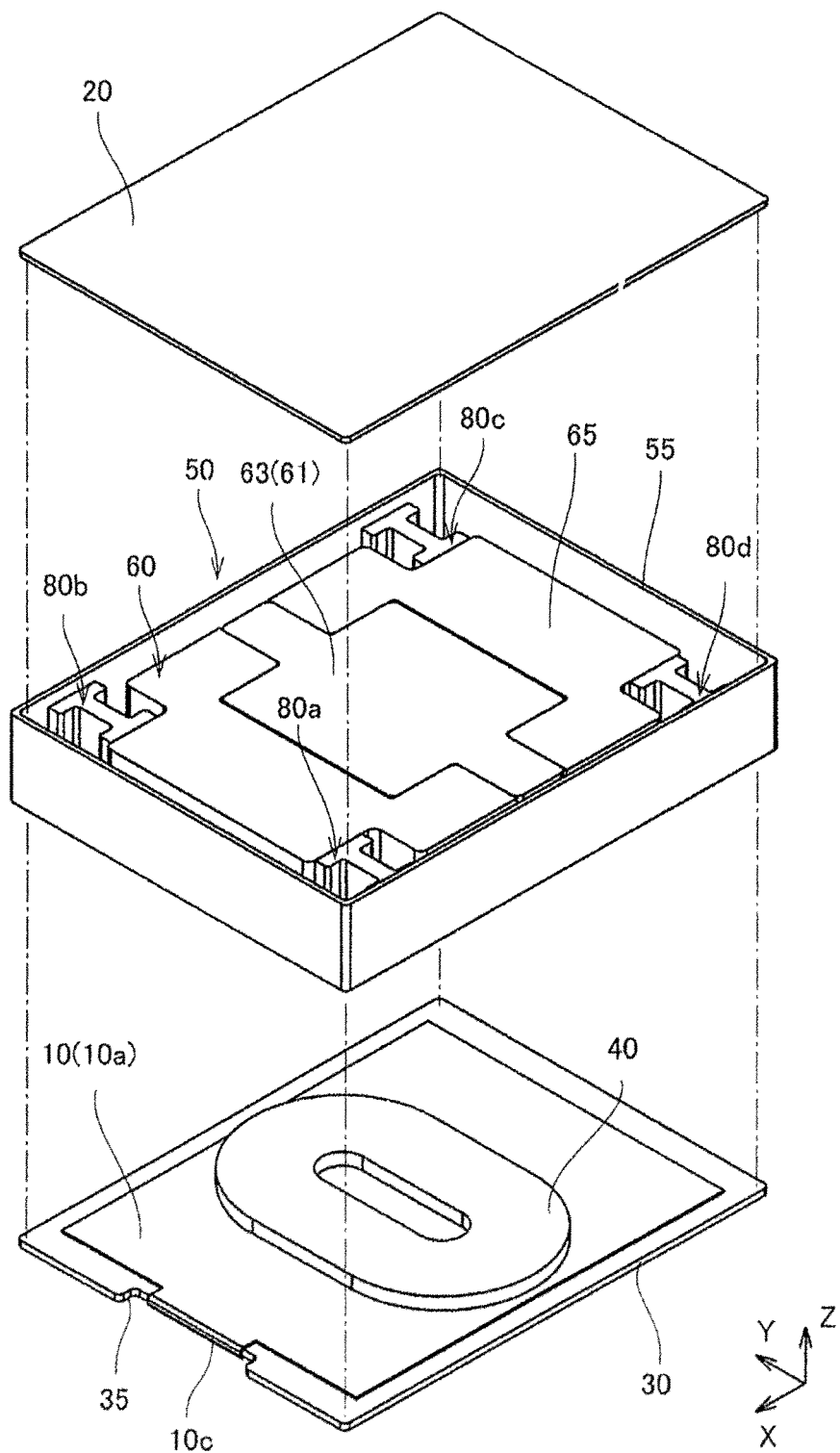
FIG. 3 is a perspective view illustrating a structure of the vibration generator.

FIG. 1 is a plan view illustrating the vibration generator according to the one embodiment of this invention. FIG. 2 is a cross-sectional view taken along line A-A in FIG. 1. FIG. 3 is a perspective view illustrating a structure of the vibration generator.

In order to facilitate understanding of a layout of components of a vibration generator 1, FIG. 1 shows a vibrator 50 and the like that are actually hidden behind a top plate 20 partially in solid lines. In FIG. 1, illustration of a flexible printed circuit (FPC: hereinafter also simply referred to as a circuit board) 10 is omitted except a part thereof.

In the following description, for vibration generator 1, there is a case in which a direction along an X axis in a coordinate system shown in FIG. 1 is referred to as a right-left direction (a positive direction along the X axis from the original point is the rightward direction). Further, there is a case in which a direction along a Y axis in the coordinate system shown in FIG. 1 is referred to as a front-back direction (a positive direction along the Y axis from the original point is the backward direction). Further, there is a case in which a direction along a Z axis in FIG. 2 (a vertical direction with respect to an XY plane in FIG. 1) is referred to as an up-down direction (a positive direction along the Z axis from the original point is the upward direction).

[Overall Structure of Vibration Generator 1]

As illustrated in FIG. 3, vibration generator 1 generally includes circuit board 10, top plate 20, a bottom plate 30, a coil 40, and vibrator 50. As illustrated in FIG. 1, vibrator 50 in this embodiment includes a frame 55, a swing unit 60, and four arm units (one example of elastic members) 80 (80a, 80b, 80c, and 80d).

As will be described later, vibration generator 1 generates vibration by swing unit 60 swinging. Swing unit 60 swings in a manner moving mainly in the right-left direction with respect to a different region of vibration generator 1 including vibrator 50 such as frame 55. Specifically, in this embodiment, a swing direction of swing unit 60 is the right-left direction.

Vibration generator 1 as a whole is formed in a thin, substantial cuboid whose vertical dimension is relatively small. Vibration generator 1 is small such that external dimensions in the right-left direction and in the front-back direction are on the order of 10 millimeters to 20 millimeters. Vibration generator 1 has a box-shaped outline such that an upper surface and a lower surface of vibrator 50 having frame 55 enclosing a lateral circumference are covered by top plate 20 and bottom plate 30, respectively.

As illustrated in FIG. 3, vibrator 50 has a structure having swing unit 60 within frame 55. Frame 55 and swing unit 60 are connected via four arm units 80.

In this embodiment, frame 55 is formed in a rectangular and annular shape, for example, by bending one or more strip-shaped metal plates and the like. In other words, frame 55 has a quadrangular, hollow, and cylindrical shape, within which swing unit 60 is disposed. It should be noted that frame 55 may not be completely annular. For example, frame 55 can be partially discontinuous, or end portions of the one or more metal plates being partially overlapped with each other, so as to be formed annularly as a whole.

Swing unit 60 is formed substantially in a rectangular shape in a planar view. Swing unit 60 has a plate shape parallel to a horizontal plane (the XY plane in FIG. 1). Swing unit 60 is formed substantially in a rectangular shape whose sides are each parallel to the front-back direction or the right-left direction in the planar view except at four corners.

Swing unit 60 is disposed at a center portion of vibrator 50, that is, a center portion of vibration generator 1, in the planar view. As illustrated in FIG. 2, swing unit 60 is disposed substantially parallel to coil 40 and facing toward coil 40.

Top plate 20 is flat-plated, and in a rectangular shape that is substantially the same as that of an upper end portion of frame 55. Top plate 20 is disposed so as to be fitted in the upper end portion of frame 55. Bottom plate 30 is flat-plated, and in a rectangular shape that is substantially the same as that of a lower end portion of frame 55. Bottom plate 30 is disposed so as to be fitted in the lower end portion of frame 55. Top plate 20 and bottom plate 30 can be adhered or welded to frame 55.

In this embodiment, a cutout 35 is provided at a part of a short side of bottom plate 30. By providing cutout 35, an interior and an exterior of vibration generator 1 are communicated.

As illustrated in FIG. 2, circuit board 10 is configured such that a first portion 10a and a second portion 10b are connected to each other via a bent portion 10c. First portion 10a is provided with an electrode connected to coil 40. Second portion 10b is provided with an electrode connected to a line for driving vibration generator 1. Bent portion 10c is configured to have a width that can pass through cutout 35. Circuit board 10 is disposed such that bent portion 10c is positioned in cutout 35, and that first portion 10a and second portion 10b sandwich bottom plate 30 from above and underneath. Using such flexible printed circuit 10 allows reducing the dimension of vibration generator 1 in the up-down direction as compared to a case in which a double-sided board is used. Further, since bottom plate 30 having a simple shape can be used, it is possible to reduce manufacturing cost of vibration generator 1. Since bottom plate 30 is provided with cutout 35, circuit board 10 may not stick out of a casing, and it is possible to ensure protection of circuit board 10.

Coil 40 is an air core coil configured by winding a conductive wire, and having a generally oval and flat plated shape. Specifically, coil 40 is a thin coil whose dimension in a direction of a winding axis is smaller than a dimension in a direction orthogonal to the direction of the winding axis. It should be noted that coil 40 can be configured by slicing a wound metallic foil, or by stacking sheet coils. Further, coil 40 can have a circular shape or a polygon shape such as a quadrangular shape in the planar view.

Coil 40 is disposed on first portion 10a of circuit board 10 such that the direction of the winding axis corresponds to the up-down direction. As illustrated in FIG. 1, coil 40 is disposed at the center portion of vibration generator 1 in the planar view so as to face toward swing unit 60 as will be described later. Coil 40 is connected to the electrode (not depicted) formed on first portion 10a of circuit board 10. It is possible to make coil 40 conductive by applying a current to the electrode (not depicted) formed on second portion 10b of circuit board 10 and exposed on an external surface of vibration generator 1.

As described above, swing unit 60 and coil 40 are covered by top plate 20, bottom plate 30, and frame 55. With this, it is possible to prevent a foreign matter such as dust from coming into vibration generator 1, and to keep vibration generator 1 operational. Further, since vibration generator 1 is surrounded by top plate 20, bottom plate 30, and frame 55 in a box-shaped manner, rigidity of vibration generator 1 itself increases. Therefore, it is possible to ensure that vibration generator 1 generates vibration. Further, vibration generator 1 becomes easy to be handled when installed to an external device and the like.

In this embodiment, frame 55 and top plate 20 are made of a soft magnetic body such as iron, for example. As having a structure of being surrounded by frame 55 and top plate 20, vibration generator 1 is insusceptible to a surrounding magnetic field and the like. Further, since a magnetic flux within vibration generator 1 may not easily leak outside, influences to external devices and circuits are prevented.

On the other hand, bottom plate 30 is made of a non-magnetic material. Bottom plate 30 is made of a non-magnetic metallic material such as non-magnetic stainless steel, for example. It should be noted that bottom plate 30 is not limited to that made of a metallic material, and can be made of a resin, for example. Further, frame 55 and top plate 20 are not limited to those made of a soft magnetic body, and can be made of a resin or a non-magnetic metallic material, for example.

[Detailed Structure of Vibrator 50]

As illustrated in FIG. 2, swing unit 60 includes a magnet 61, a back yoke 63, and a weight 65. Magnet 61 is a permanent magnet and disposed in substantial center of swing unit 60. Back yoke 63 is a soft magnetic body such as iron, for example, and disposed on a top of magnet 61. Weight 65 is disposed around magnet 61 and back yoke 63 so as to hold magnet 61 and back yoke 63. Weight 65 is made of a metal having a relatively large specific gravity, for example.

In this embodiment, as magnet 61, two magnets (magnets 61a, 61b) disposed respectively on right and left are provided. Magnet 61a and magnet 61b are configured to have polarities opposite from each other. Specifically, a direction of the magnetic pole of magnet 61a with respect to coil 40 is opposite from that of magnet 61b. It should be noted that, as magnet 61, it is possible to provide a single magnet magnetized such that the magnetic directions with respect to coil 40 are different between the right side and the left side. For example, magnet 61 can be magnetized and polarized at a bottom side portion facing toward coil 40 such that the north pole and the south pole are opposite along the right-left direction. Further, three or more magnets 61 can be disposed.

As illustrated in FIG. 1, each arm unit 80 includes a weight joint portion 81, a frame joint portion 83, a beam portion 85, and a gate portion 87. Weight joint portion 81 is jointed to an outer circumferential surface of weight 65 out of swing unit 60. Frame joint portion 83 is jointed to an inner side surface of frame 55. Beam portion 85 connects between weight joint portion 81 and frame joint portion 83. Gate portion 87 is formed on a side of weight joint portion 81. Each arm unit 80 is integrally molded by an elastic resin, for example.

Beam portion 85 is a region of each arm unit 80 that mainly deflects when swing unit 60 moves with respect to frame 55. Each arm unit 80 is disposed such that a longitudinal direction of corresponding beam portion 85 is substantially parallel to the Y axis direction. Specifically, beam portion 85 is formed such that its longitudinal direction corresponds to a direction vertical to the swing direction of swing unit 60.

In this embodiment, a cross section perpendicular to the longitudinal direction of beam portion 85 (specifically, a cross section parallel to a ZX plane, hereinafter also simply referred to as the cross section of beam portion 85) is rectangular. A short side of this cross section is substantially parallel to the swing direction of swing unit 60.

Four arm units 80 are connected to four corners (right rear, right front, left front, and left rear) of swing unit 60, respectively, such that swing unit 60 is supported in a well-balanced manner with respect to frame 55. Arm unit 80a is disposed at right rear of weight 65. Arm unit 80b is disposed at right front of weight 65. Arm unit 80c is disposed at left front of weight 65. Arm unit 80d is disposed at left rear of weight 65.

Swing unit 60 has a shape symmetrical with respect both to a first plane and to a second plane. The first plane is a plane passing the center of swing unit 60 in the planar view and parallel to an YZ plane. The second plane is a plane passing the center of swing unit 60 and parallel to the ZX plane. Further, each of four arm units 80 is disposed at a position and in a posture both symmetrical with respect both to the first plane and to the second plane. Specifically, vibrator 50 is configured symmetrically with respect both to the first plane and to the second plane.

As illustrated in FIG. 1, grooves 67 (67a, 67b, 67c, and 67d) are provided respectively in cutout portion 90 regions of weight 65 in which arm units 80 are disposed (joints connecting weight 65 to arm units 80).

Figure 4:
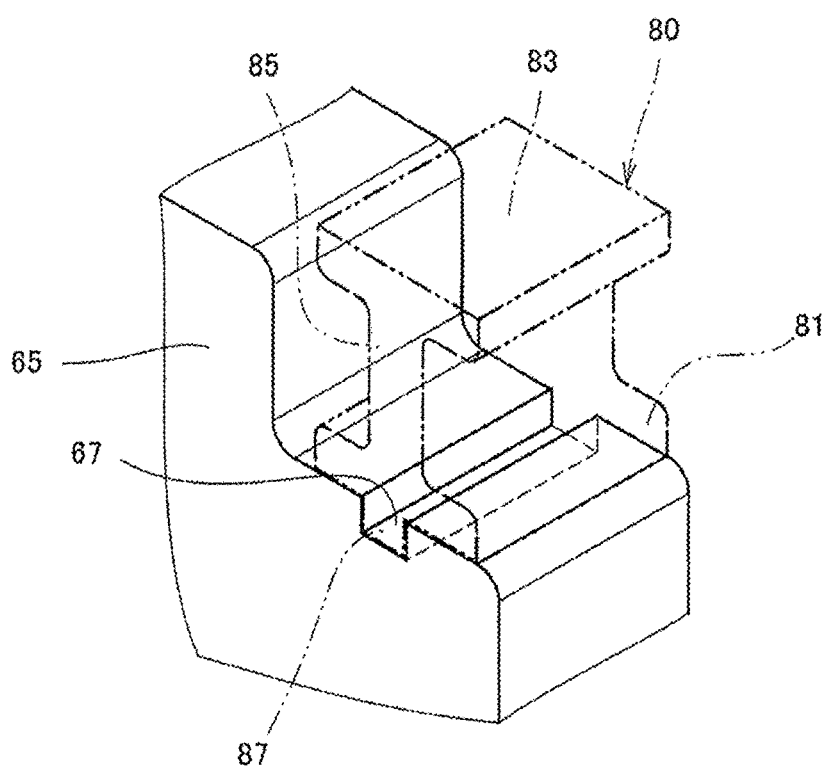
FIG. 4 is a perspective view illustrating a region of a weight where a groove is provided.
Figure 4:

FIG. 4 is a perspective view illustrating the regions of weight 65 in which grooves 67 are provided.

Referring to FIG. 4, grooves 67 are provided such that their longitudinal directions correspond to a direction that is not parallel to the swing direction of swing unit 60 (here, mainly the X axis direction). Specifically, grooves 67 are provided such that their longitudinal directions correspond to the Z axis direction that is substantially perpendicular to the swing direction of swing unit 60.

While grooves 67 are provided in this manner, arm units 80 are each provided with gate portion 87 projecting from weight joint portion 81 so as to be cut into corresponding grooves 67. Specifically, a jointing surface between arm unit 80 and weight 65 is uneven along the direction vertical to the swing direction of swing unit 60.

[Description of Manufacturing Method of Vibrator 50]

In this embodiment, vibrator 50 is configured by frame 55, swing unit 60 (magnet 61, back yoke 63, and weight 65), and four arm units 80 that are integrally molded by insert molding. Vibrator 50 is manufactured in the following manner.

First, back yoke 63 and magnet 61 are applied to weight 65. With this, swing unit 60 is configured. Further, frame 55 bent into a rectangular shape is prepared. Back yoke 63 and magnet 61 may be applied to each other by spot welding or adhesion, for example.

Next, frame 55 and swing unit 60 are set in a molding tool of vibrator 50.

Then, a resin to form arm units 80 is injected into the molding tool. By removing the molding tool, vibrator 50 can be obtained.

It should be noted that back yoke 63 and magnet 61 can be applied to a portion of weight 65 after the integral molding.

As the resin used for arm units 80 and the like (the resin used in the integral molding), a silicon resin is used, for example. Alternatively, heat-resistant fluorine-based gum and the like can be used. By forming vibrator 50 using such gum, it is possible to improve heat resistance of vibration generator 1. The elastic body is not limited to the above examples, and various types can be used.

As weight 65 is provided with grooves 67 as described above, the resin is injected using grooves 67 as gates when integrally molding vibrator 50. Therefore, it is possible to further facilitate the molding.

[Description of Operation of Vibration Generator 1]

In vibration generator 1, swing unit 60 can be moved with respect to frame 55 while deforming beam portion 85 of arm unit 80. Coil 40 generates a magnetic field for causing swing unit 60 to perform a reciprocatory motion with respect to frame 55. Upon excitation of coil 40, swing unit 60 moves with respect to frame 55 accordingly. Vibration generator 1 generates vibration by repeating the reciprocatory motion of swing unit 60.

More specifically, when a current flows through coil 40, coil 40 is excited, and a magnetic field is produced in the up-down direction. Upon production of the magnetic field, magnet 61 is affected by the magnetic field and a repelling and attracting force is produced. A force of displacing leftward or rightward acts on swing unit 60 depending on the direction of the magnetic field and an arrangement of the magnetic poles of magnet 61. Accordingly, swing unit 60 is moved toward either side along the right-left direction while causing each beam portion 85 to deflect. By an alternate current flowing through coil 40, swing unit 60 performs a reciprocatory linear motion with respect to frame 55 in the right-left direction in the planar view according to the alternate current. With this, vibration generator 1 generates a vibration force.

If a current value of the alternate current decreases and the magnetic field becomes smaller or vanishes, swing unit 60 attempts to return to the center portion of vibration generator 1 in the planar view by a restoring force of arm units 80. At this time, as arm units 80 are elastic bodies, energy consumed by arm units 80 is relatively large. Therefore, the vibration is quickly attenuated.

In this embodiment, bottom plate 30 is configured by a non-magnetic material. Accordingly, a magnetic attracting force by magnet 61 is not generated between swing unit 60 and bottom plate 30. Swing unit 60 is moved smoothly and efficiently according to the magnetic field generated by coil 40. Therefore, it is possible to make vibration generator 1 thin even further and to operate appropriately.

[Description of Shape of Beam Portion 85]

In this embodiment, the shape of beam portion 85 of each arm unit 80 is determined such that vibrator 50 efficiently operates as described below.

Figure 5:
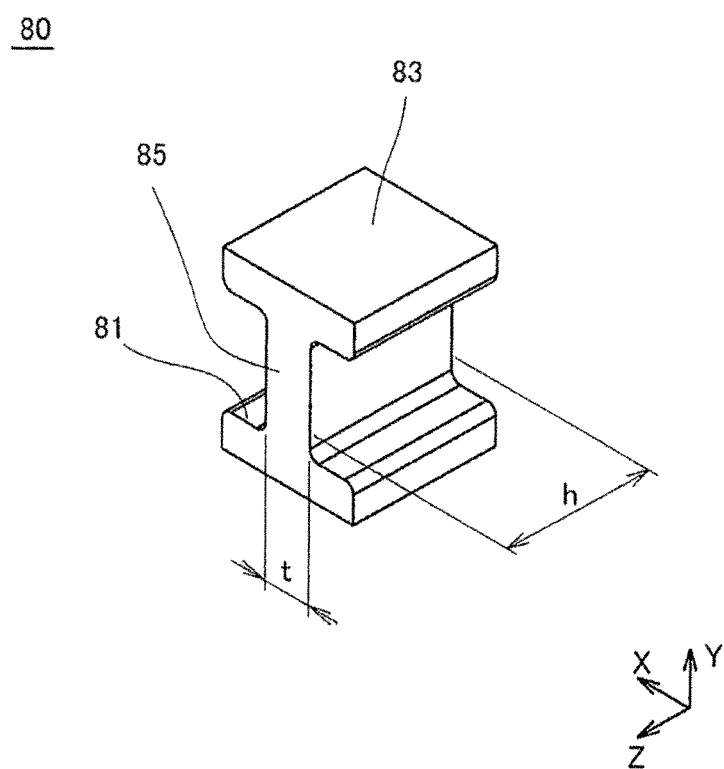
FIG. 5 is a perspective view illustrating an arm unit.

FIG. 5 is a perspective view illustrating arm unit 80.

As illustrated in FIG. 5, in this embodiment, a dimension h of beam portion 85 in a longitudinal direction (a dimension of a long side of a cross section of beam portion 85) is larger than a dimension t of beam portion 85 in a lateral direction (a dimension of a short side of the cross section of beam portion 85). For example, dimension h in the longitudinal direction is on the order of twice as large as dimension t in the lateral direction.

By setting the shape of beam portion 85 in this manner, a behavior of swing unit 60 in the Z axis direction is relatively suppressed, and a large vibration amount is obtained. Therefore, a force generated by excitation of coil 40 can be efficiently transmitted in a main swing direction of swing unit 60. It should be noted that an optimal dimensional ratio between dimension h in the longitudinal direction and dimension t in the lateral direction of beam portion 85 is appropriately derived by such a way as a simulation while changing parameters of these dimensions.

Effects of Embodiment

As described above, in this embodiment, vibrator 50 is configured by integrally molding frame 55, swing unit 60, and arm unit 80. Therefore, it is possible to assemble vibrator 50 easily and at high assembly accuracy. Since there is no time and effort for attachment of swing unit 60 to frame 55 and the number of components can be reduced, it is possible to reduce manufacturing cost of vibration generator 1. Further, since swing unit 60 and frame 55 are integrally formed, an attachment between swing unit 60 and frame 55 may not become weak. Therefore, it is possible to improve reliability of vibration generator 1 against impact. As any separate member such as a screw is not necessary for attachment of swing unit 60 to frame 55, it is possible to make vibration generator 1 further smaller, thinner, and lighter.

In this embodiment, as swing unit 60 and frame 55 are configured by separate members, the number of components is reduced. Further, it is possible to select the material of frame 55 appropriately while providing a plain structure that is easily assembled. Therefore, it is possible to provide a configuration in which frame 55 acts as a magnetic shield without additionally providing a member functioning as a magnetic shield, for example.

Vibrator 50 is integrally molded including frame 55. Therefore, it is possible to achieve a sufficiently large vibration force while keeping the size of arm units 80 relatively small. It is possible to make the size of swing unit 60 relatively large in proportion to the size of vibrator 50, that is, in proportion to the size of vibration generator 1 as a whole. Accordingly, it is also possible to achieve a relatively large vibration amount with small-sized vibration generator 1. In particular, in each arm unit 80, the longitudinal direction of beam portion 85 is the direction orthogonal to the swing direction, and beam portion 85 deforms efficiently in the swing direction. Therefore, it is possible to obtain the effect of this embodiment more effectively.

Arm units 80 are disposed symmetrically with respect both to the first plane and the second plane. Therefore, swing unit 60 is supported in a well-balanced manner, and vibration generator 1 can generate vibration more effectively.

A joint connecting arm unit 80 and weight 65 is uneven since groove 67 is provided. In particular, groove 67 is provided such that its longitudinal direction is a direction different from the swing direction of swing unit 60. It is possible to achieve a joint strength between arm unit 80 and swing unit 60 sufficiently even without groove 67. However, by providing groove 67 in this manner, it is possible to ensure prevention of such a trouble that swing unit 60 is misaligned with respect to arm unit 80 in the swing direction. Accordingly, it is possible to further improve durability of vibration generator 1.

Description of Modified Examples

The vibrator can include a slit in the beam portion of the arm unit.

Figure 6:
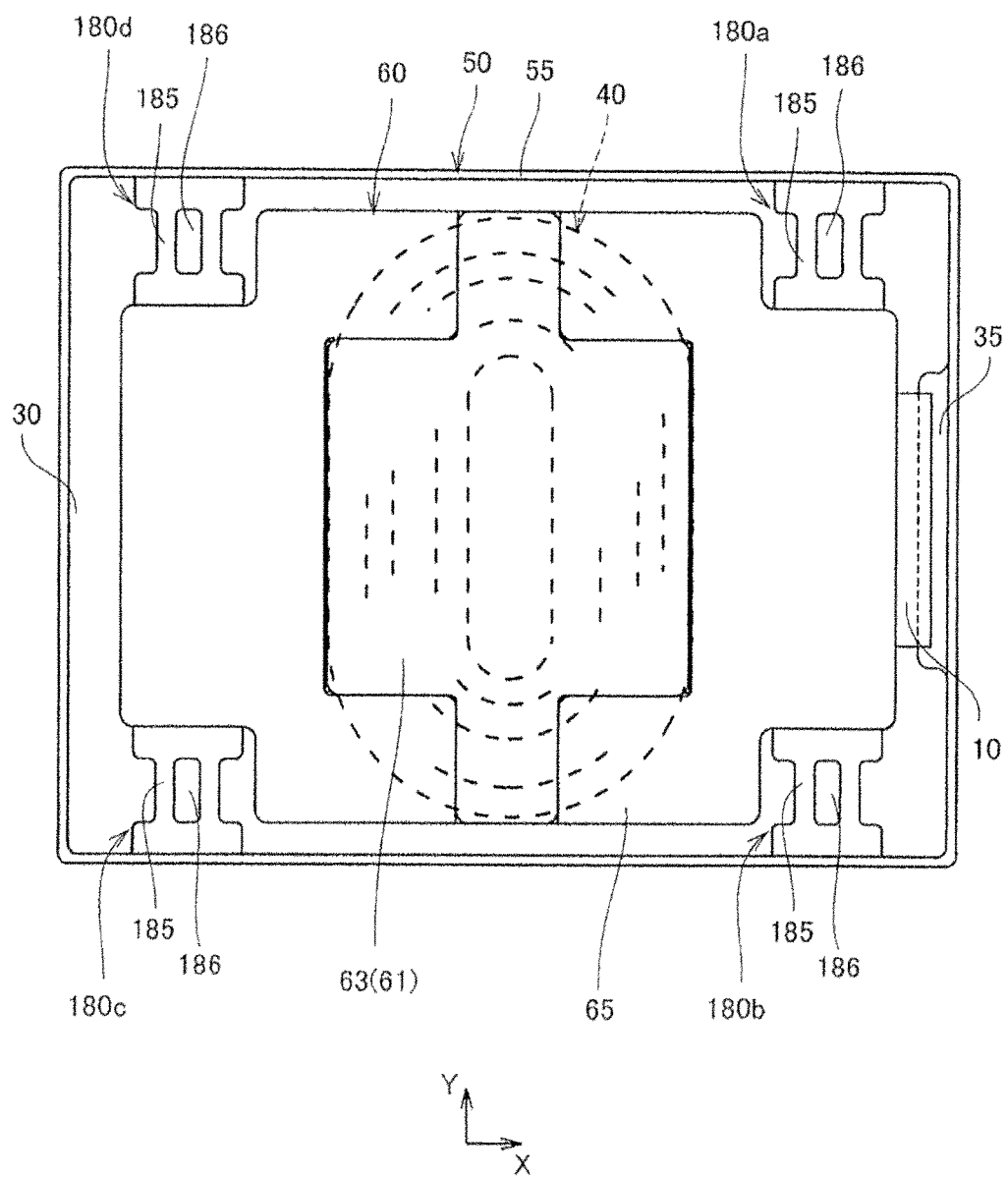
FIG. 6 is a plan view illustrating a vibration generator according to one modified example of this embodiment.

FIG. 6 is a plan view illustrating a vibration generator according to one modified example of this embodiment.

In FIG. 6, a vibration generator 101 is illustrated in the same manner as in FIG. 1. Vibration generator 101 is different from vibration generator 1 in that arm units 180 (180a, 180b, 180c, and 180d) having a shape slightly different from that of arm units 80 are provided. It should be noted that illustration of groove 67 is omitted in FIG. 6. Other than the difference between arm units 80 and arm units 180, vibration generator 101 has substantially the same configuration as vibration generator 1.

Figure 7:
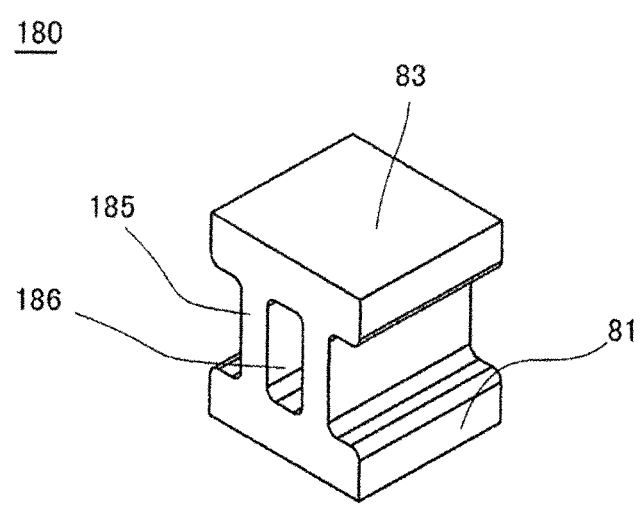
FIG. 7 is a perspective view illustrating an arm unit.
Figure 7:

FIG. 7 is a perspective view illustrating arm unit 180.

As illustrated in FIG. 7, arm unit 180 has a beam portion 185 whose width in the X axis direction is wider than that of beam portion 85 of arm unit 80. At a center portion in the X axis direction of beam portion 185, a slit 186 is provided along a longitudinal direction of beam portion 185. Slit 186 is provided so as to penetrate from an upper surface to a lower surface of beam portion 185. Slit 186 is provided throughout an entire region between weight joint portion 81 and frame joint portion 83. Specifically, providing slit 186 divides beam portion 185 into two beams whose width in the X axis direction is narrow. A dimension of the width of beam portion 185 in the X axis direction and a dimension of the width of slit 186 can be appropriately set such that a desired characteristic such as amplitude of vibrator 50 in vibration can be achieved.

By providing beam portion 185 with slit 186 in this manner, a stress produced in beam portion 185 when swing unit 60 is moved is reduced as compared to a case in which beam portion 85 without slit 186 is used. Therefore, it is possible to relatively increase the lifetime of beam portion 185, and to further improve the durability of vibration generator 101.

The groove can be provided only partially in the joint connecting the weight to the arm unit.

Figure 8:
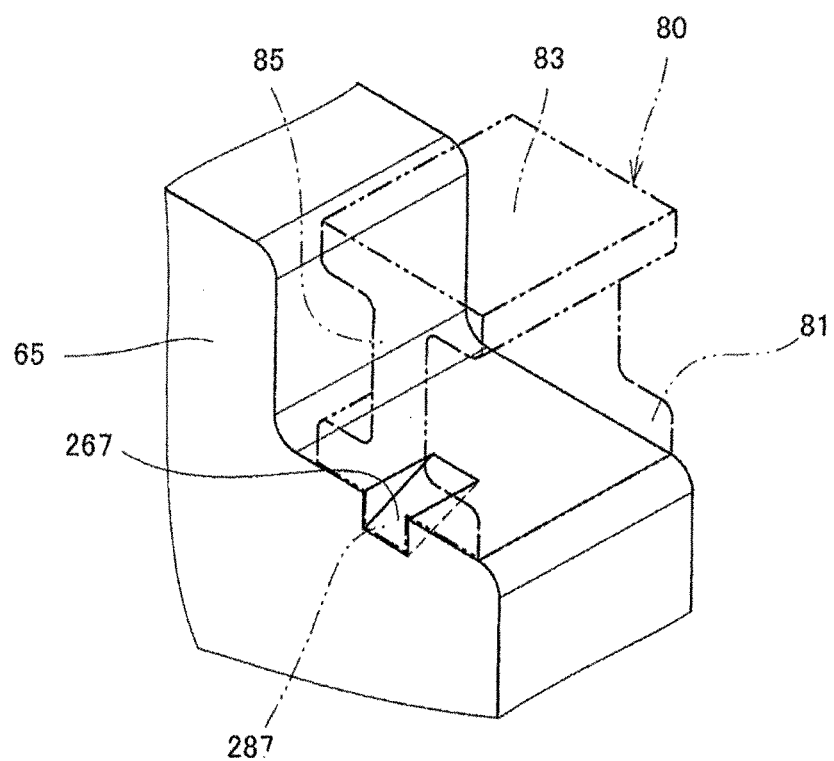
FIG. 8 is a perspective view illustrating a region of a weight, where a groove is provided, of a vibration generator according to another modified example of this embodiment.

FIG. 8 is a perspective view illustrating a region of the weight, where the groove is provided, of the vibration generator according to another modified example of this embodiment.

As illustrated in FIG. 8, weight 65 can be provided with a groove 267 of a shape different from that of groove 67 according to the above embodiment. In this case, arm unit 80 is provided with a projecting portion 287 having a shape corresponding to the shape of groove 267 by using groove 267 as a gate in molding of arm unit 80.

Groove 267 has a shape engraved downward from the upper surface of weight 65 by a predetermined distance, for example. A lower end portion of groove 267 does not reach a lower surface of weight 65. Specifically, groove 267 is provided only partially in the joint connecting weight 65 to arm unit 80.

It is possible to provide the same effect as in the above embodiment by providing groove 267 having such a shape. Specifically, the jointing surface between weight 65 and arm unit 80 is uneven, and arm unit 80 does not easily misaligned with respect to weight 65 when swing unit 60 swings. Further, since groove 267 is used as the gate in molding of arm unit 80, it is possible to easily mold arm unit 80.

[Others]

It is not necessary to provide the groove of the weight and the projecting portion of the arm unit. It is possible to ensure a sufficient joint strength even if the gate position is not provided on a side of the weight.

It is possible to provide more than one coil. For example, it is possible to provide the coils aligned right and left along the swing direction of the swing unit. In this case, it is possible to use a magnet that is magnetized such that a side facing toward the coils is unipolar.

The shape of the frame and the shape of the vibrator are not limited to rectangular in the planar view. It is possible to provide the shape in various shapes such as an oval or polygonal shape for example.

The coil can be attached to a main circuit board of a device or the like that uses vibration, and the swing unit can be driven by attaching the vibrator to the main circuit board having the coil. In other words, the vibration generator can be configured by using a coil mounted on a circuit board of a different device.

It is not necessarily required to attach the top plate to the vibration generator. The top plate is useful for preventing dusts from coming into the vibrator. However, the top plate may not be used in a case in which the vibration generator is contained in a narrow space, for example.

It is possible to use a printed circuit board (such as a double-sided board) instead of the flexible printed circuit. In this case, a printed circuit board can be used instead both of the bottom plate and the flexible printed circuit, and the bottom plate may not be used.

According to these embodiments, the frame, the swing unit, and the elastic member are integrally molded with each other. Therefore, it is possible to assemble easily and accurately, and to provide a vibrator with which a large vibration force in proportion to the size of the vibration generator can be obtained, as well as a vibration generator.

It should be understood that the embodiments described above are illustrative and non-restrictive in every respect. The scope of the present invention is defined by the terms of the claims, rather than the description above, and is intended to include any modifications within the scope and meaning equivalent to the terms of the claims.

What is claimed is:

1. A vibrator generator comprising:
a top plate;
a bottom plate;
a frame arranged between the top plate and the bottom plate;
a swing unit arranged inside the frame;
an elastic member coupling the swing unit and the frame; and
a coil having a flat plated shape; wherein:
the coil faces the swing unit,
the swing unit includes a magnet and a weight arranged around the magnet,
an inner side surface of the frame extends in a swing direction of the swing unit,
an outer circumferential surface of the weight faces the inner side surface of the frame,
the outer circumferential surface of the weight has a recessed portion, and
the elastic member is arranged between the recessed portion and the inner side surface of the frame,
a groove is provided in a jointing surface between the elastic member and the weight, and
the jointing surface between the elastic member and the weight is uneven between a surface of the weight facing the top plate and a surface of the weight facing the bottom plate.

2. The vibrator generator according to claim 1, wherein the elastic member includes a beam portion capable of deflecting when the swing unit moves with respect to the frame.

3. The vibration generator according to claim 1, comprising a cuboid shape, wherein
the swing unit swings in a longitudinal direction.

4. The vibration generator according to claim 1, wherein the swing unit moves with respect to the frame, according to current flowing in the coil.

5. The vibration generator according to claim 1, wherein a surface of the weight on a side of the coil is recessed.

6. The vibration generator according to claim 1, wherein a surface of the elastic member coupling with the frame is arranged at a same position as a surface of the elastic member coupling with the weight in the swing direction of the swing unit.

7. The vibration generator according to claim 1, wherein a surface of the elastic member coupling with the frame faces a surface of the elastic member coupling with the weight.

8. The vibrator generator according to claim 1, wherein
the weight includes a first joint jointed to the elastic member,
the elastic member includes a second joint jointed to the weight,
a part in an outer circumferential surface of the weight facing the frame forms the first joint,
the jointing surface is formed with the part in the outer circumferential surface of the first joint facing the frame and a part in an outer circumferential surface of the second joint,
the surface of the first joint facing the top plate and the surface of the second joint facing the top plate are arranged in a line in a horizontal direction, and the surface of the first joint facing the bottom plate and the surface of the second joint facing the bottom plate are arranged in a line in the horizontal direction.

9. A vibrator generator comprising:
a top plate;
a bottom plate;
a frame arranged between the top plate and the bottom plate;
a swing unit; and
an elastic member supporting displaceably the swing unit with respect to the frame in a horizontal direction,
wherein:
the swing unit includes a weight including a first joint jointed to the elastic member,
a part in an outer circumferential surface of the weight facing the frame forms the first joint,
the elastic member includes a second joint jointed to the weight,
a jointing surface is formed with the part in the outer circumferential surface of the first joint facing the frame and a part in an outer circumferential surface of the second joint,
the part in the outer circumferential surface of the first joint forming the jointing surface or the part of the outer circumferential surface of the second joint forming the jointing surface is inclined and uneven between a surface of the weight facing the top plate and a surface of the weight facing the bottom plate,
the surface of the first joint facing the top plate and the surface of the second joint facing the top plate are arranged in a line in the horizontal direction,
the surface of the first joint facing the bottom plate and the surface of the second joint facing the bottom plate are arranged in a line in the horizontal direction.

10. A vibrator generator according to claim 9, wherein:
the elastic member includes a beam portion,
a dimension of the beam portion in a direction from the bottom plate toward the top plate is larger than a dimension of the beam portion in the swing direction of the swing unit.

11. A vibrator generator comprising a plurality of elastic members including the elastic member, wherein
the plurality of elastic members includes a plurality of second joints including the second joint,
the weight includes a plurality of first joints including the first joint,
jointing surfaces including the jointing surface are formed with the part in the outer circumferential surface of the first joint facing the frame and the part in the outer circumferential surfaces of the second joints.

12. A vibrator generator according to claim 9, wherein
only a part in the outer circumferential surface of the first joint forming the jointing surface is inclined and uneven between a surface of the weight facing the top plate and a surface of the weight facing the bottom plate.

13. A vibrator generator according to claim 9, wherein
the part in the outer circumferential surface of the first joint forming the jointing surface or the part of the outer circumferential surface of the second joint forming the jointing surface is inclined in a direction from the top plate toward the bottom plate.

14. A vibrator generator according to claim 9, wherein
an inside of the part in the outer circumferential surface of the first joint forming the jointing surface and an inside of the part in the outer circumferential surface of the second joint forming the jointing surface are inclined and uneven.

15. A vibrator generator according to claim 9, wherein:
a groove is provided at the surface of the first joint facing the bottom plate, and
the groove forms the jointing surface.

16. A vibrator generator according to claim 9, wherein:
a groove is provided at the surface of the second joint facing the top plate,
the groove forms the jointing surface.

17. A vibrator generator according to claim 16, wherein
the groove is formed in a direction different from a swing direction of the swing unit.

18. A vibrator generator according to claim 9, wherein
the jointing surface includes a plane.

19. A vibrator generator according to claim 9, wherein
the jointing surface includes a projecting part.

20. A vibrator generator according to claim 9, comprising a casing forming the bottom plate and the top plate and the frame, wherein
the casing includes a box-shaped outline.

* * * * *